(12) United States Patent
Murray

(10) Patent No.: US 11,821,221 B2
(45) Date of Patent: Nov. 21, 2023

(54) HAND TOOL AND METHOD OF CONSTRUCTION

(71) Applicant: Level 5 Tools, LLC, Kansas City, KS (US)

(72) Inventor: Scott A. Murray, Kansas City, KS (US)

(73) Assignee: LEVEL 5 TOOLS, LLC, Kansas City, KS (US)

(*) Notice: Subject to any disclaimer, the term of this patent is extended or adjusted under 35 U.S.C. 154(b) by 414 days.

(21) Appl. No.: 16/833,097

(22) Filed: Mar. 27, 2020

(65) Prior Publication Data

US 2020/0308853 A1 Oct. 1, 2020

Related U.S. Application Data

(60) Provisional application No. 62/851,359, filed on May 22, 2019, provisional application No. 62/824,490, filed on Mar. 27, 2019.

(51) Int. Cl.
*E04F 21/165* (2006.01)
*B25G 3/34* (2006.01)
(Continued)

(52) U.S. Cl.
CPC .......... *E04F 21/1652* (2013.01); *B08B 1/005* (2013.01); *B23K 9/007* (2013.01);
(Continued)

(58) Field of Classification Search
CPC ..... E04F 21/1652; B08B 1/005; B23K 9/007; B23K 9/028; B23K 2101/20;
(Continued)

(56) References Cited

U.S. PATENT DOCUMENTS 2,498,107 A * 2/1950 Ferguson ................. B25G 1/00
30/342
4,986,475 A 1/1991 Spadafora et al.
(Continued)

FOREIGN PATENT DOCUMENTS

CN 207700645 U * 8/2018

OTHER PUBLICATIONS

Translation of CN207700645U, retrieved from Espacenet on May 19, 2022 (Year: 2018).*

*Primary Examiner* — Tom Rodgers
(74) *Attorney, Agent, or Firm* — TUCKER ELLIS LLP

(57) ABSTRACT

A metal hand tool including a handle attached to a blade piece and method of construction. The blade piece includes a blade opposite an elongated tang. The handle is made up of two, welded, symmetrical handle halves, each handle half having an opening for receiving a hang hole piece and a notched distal end for forming a handle opening to receive the blade piece elongated tang. In an embodiment, the handle includes a curved distal end accommodating a curved welded connection between the blade piece and the handle. The hand tool further includes a hang hole piece configured for placement through the hang hole openings in the handle and for welded connection to the handle. In an embodiment, the elongated tang includes a hang hole opening through which the hang hole extends. Some embodiments further include one or more tang guide pieces welded to the interior of the handle.

6 Claims, 14 Drawing Sheets

(51) Int. Cl.
  *B23K 9/007* (2006.01)
  *B08B 1/00* (2006.01)
  *B23K 9/028* (2006.01)
  *B23K 101/20* (2006.01)
  *B23K 103/04* (2006.01)
(52) U.S. Cl.
  CPC ............... *B23K 9/028* (2013.01); *B25G 3/34* (2013.01); *B23K 2101/20* (2018.08); *B23K 2103/05* (2018.08)
(58) Field of Classification Search
  CPC ........ B23K 2103/05; B25G 3/34; B25G 3/04; B25G 3/08; B25G 3/10; B25G 3/12; A47L 13/022; A47L 13/08
  USPC ......................................................... 15/143.1
  See application file for complete search history.

(56) References Cited

U.S. PATENT DOCUMENTS

| | | |
|---|---|---|
| 5,882,691 A | 3/1999 | Conboy |
| 5,902,451 A | 5/1999 | O'Mara et al. |
| 5,953,799 A | 9/1999 | Panaccione et al. |
| 6,260,238 B1 | 7/2001 | MacMillan |
| 6,473,939 B1 | 11/2002 | Stegmaier |
| 6,581,805 B2 | 6/2003 | Conboy et al. |
| 6,726,868 B1 | 4/2004 | Panfili et al. |
| 6,742,215 B2 | 6/2004 | Panfili et al. |
| 6,793,428 B2 | 9/2004 | Lithgow |
| D508,638 S | 8/2005 | Meyer et al. |
| 7,114,869 B2 | 10/2006 | MacMillan |
| D541,616 S | 5/2007 | Bruno et al. |
| D545,168 S | 6/2007 | Rudder |
| D549,070 S | 8/2007 | Bruno et al. |
| D551,053 S | 9/2007 | Bruno et al. |
| D553,939 S | 10/2007 | Bruno et al. |
| D553,941 S | 10/2007 | Bruno et al. |
| D564,383 S | 4/2008 | Bruno et al. |
| D565,921 S | 4/2008 | Bruno et al. |
| 7,434,318 B2 | 10/2008 | Perez et al. |
| 7,458,127 B2 | 12/2008 | Bruno et al. |
| D584,126 S | 1/2009 | Meyer |
| 7,556,447 B2 | 7/2009 | Bruggeman et al. |
| D614,471 S | 4/2010 | Meyer et al. |
| 7,775,736 B2 | 8/2010 | Song |
| 8,381,789 B2 | 2/2013 | Payne |
| 8,517,077 B2 | 8/2013 | Payne |
| 8,747,006 B2 | 6/2014 | Payne |
| 9,051,744 B1 | 6/2015 | Murray et al. |
| 9,283,586 B2 | 3/2016 | MacMillan |
| D838,159 S | 1/2019 | Jimenez et al. |
| 2001/0003563 A1 | 6/2001 | Schauer et al. |
| 2010/0260530 A1 | 10/2010 | Schlecht et al. |
| 2011/0020050 A1 | 1/2011 | Sandahl et al. |
| 2015/0328607 A1 | 11/2015 | Wittbold et al. |
| 2016/0121287 A1 | 5/2016 | Brown et al. |
| 2017/0065950 A1 | 3/2017 | Schenck et al. |
| 2018/0087281 A1 | 3/2018 | Murray |
| 2018/0333035 A1* | 11/2018 | Chang .................... B44D 3/164 |

* cited by examiner

HAND TOOL AND METHOD OF CONSTRUCTION

CROSS-REFERENCE TO RELATED APPLICATIONS

This application claims priority in U.S. Provisional Patent Application Ser. No. 62/824,490, filed Mar. 27, 2019, and in U.S. Provisional Patent Application Ser. No. 62/851,359, filed May 22, 2019, which are incorporated herein by reference.

BACKGROUND OF THE INVENTION

1. Field of the Invention

The present invention relates generally to hand tools and, more specifically, to durable, drywall finishing hand tools and methods of construction.

2. Description of the Related Art

Hand tools, such as putty knives, also known as joint knives, and taping knives, are commonly used in drywall finishing to spread putty or joint compound and/or to scrape walls and surfaces during installation of drywall, also known as gypsum board. These tools are also commonly used to scrape various surfaces, including but not limited to removal of textured ceiling or wall surfaces, removal of wallpaper, and removal of adhesives. Such putty knives and taping knives each include a handle opposite a metal blade, which blade is preferably flexible to accommodate efficient scraping and spreading techniques. Additionally, other industries, including but not limited to the food industry, utilize similar hand tools, such as scrapers or spatulas, to scrape surfaces, cut various objects, and/or flip various objects.

Many currently available putty knives, taping knives, scrapers, and spatulas include plastic or rubber handles. However, some users find such plastic or rubber handles to be uncomfortable to hold or to use. Additionally, some users find these plastic or rubber handles to be too weak and/or susceptible to breaking after repeated application of force on the blade. Furthermore, some industries and locations, including but not limited to the food industry and medical facilities, require sterile environments, and plastic or rubber handles can allow for contamination to occur and/or unwanted microorganisms to grow. Accordingly, a comfortable, durable, sterilizable hand tool is desired.

While some companies offer putty knives and/or taping knives which are fully made of metal, such available metal hand tools are weaker than many users desire. These tools are weaker than desired because they generally have one insufficient point of connection between the blade and the handle, generally rivets or a small weld at the base of the handle to the blade. Wear and tear from repeated application of force to these tools can make them prone to breaking. What is needed is a stronger, more durable, sterilizable, and comfortable hand tool configured for scraping, spreading, cutting, and/or flipping.

Heretofore there has not been available a hand tool and method of construction with the advantages and features of the present invention.

SUMMARY OF THE INVENTION

The present invention discloses a strong, durable, all metal hand tool and method of construction. In a preferred embodiment, the hand tool is comprised completely of stainless steel, or an alternative sterilizable metal, and includes a blade piece connected to a handle. In an aspect of the present invention, the blade piece of the hand tool includes a blade and an elongated tang. The elongated tang extends within the handle of the hand tool. The handle is composed of two welded together, symmetrical, stainless steel handle half pieces, each handle half having an opening near the proximal end for a hang hole. The handle halves each further include a slightly notched distal end such that when the handle halves are put together to form the assembled handle of the hand tool, the handle distal end forms an opening configured for fitting closely around the blade piece elongated tang.

In an exemplary embodiment, the blade piece elongated tang extends into the handle most of the length of the handle and includes an opening for a hang hole. A hang hole piece is configured for closely fitting through the openings near the proximal ends of the handle half pieces and the elongated tang and for allowing a user to hang the hand tool on a hook or other object as desired. The hang hole piece connecting through the handle halves and the elongated tang provides an added point of strength for the connection of the blade piece to the handle. However, alternative embodiments have an elongated tang which only extends proximally into the handle to a position distal of the handle hang hole openings.

In one aspect of the present invention, one handle half includes an additional stainless steel guide piece welded to the inside of the handle half at a longitudinal position closer to the proximal end of the handle than the distal end but distal of the hang hole opening. This additional steel guide piece extends substantially across the entire width of the handle half. The additional steel guide piece extends outward from the inner portion of the handle half such that approximately half of the additional steel guide piece fits within the handle half to which it is welded, and the other approximate half of the additional steel guide piece fits within the second handle half when the handle halves are assembled to form the handle. This additional steel guide piece further includes an opening configured for receiving the tang of the blade piece. The additional steel guide piece opening is configured to fit closely around the blade piece tang, providing an additional point of strength between the blade piece and the handle.

In an alternative aspect of the present invention, each handle half includes an alternative additional stainless steel guide piece welded on the inside of the handle half at an approximate midpoint of the handle. Such alternative additional steel guide pieces in this embodiment are configured for making contact with the blade piece tang on either side of the tang when the hand tool is assembled, providing an additional point of strength.

Another aspect of the present invention includes the handle of the hand tool having a curved distal end. In a preferred embodiment, the curved handle distal end has a curvature which is concave toward the rest of the handle and convex toward the blade of the assembled hand tool. With the blade piece assembled into the handle, the blade piece and the handle are welded to each other along each side of the handle curved distal end. The curvature of the handle curved distal end provides additional surface area for the welded connection between the blade piece and the handle piece, adding strength. Additionally, this curved weld helps to better displace the force applied to the blade when compared to a welded connection made in one linear plane. In an exemplary embodiment, the hand tool also includes a flared handle distal end with the blade piece having a corresponding width, resulting in a widened curved welded connection between the blade piece and the handle and providing added strength and durability to the hand tool.

In construction of an exemplary embodiment, an additional stainless steel guide piece is first welded to the inside of one of the handle halves. The handle halves are then aligned with each other and welded together. First, the halves are spot welded together at a total of four different points: one point on either side of the handle distal end and one point on either side of the handle proximal end. The handle halves are then precision welded to each other around the outer edges of the handle, leaving open the distal end opening of the handle for insertion of the blade piece tang. The blade piece tang is then inserted into the handle through the open distal end and further through the opening in the additional steel guide piece until the hang hole opening of the blade piece tang matches up with the hang hole openings in the handle. A stainless steel hang hole is then inserted through the openings in the handle and the blade piece. Finally, the hang hole is precision welded to the handle around the edges of the hang hole, and the handle is precision welded to the blade piece along the distal end of the handle.

In alternative embodiments, prior to assembly of the handle, an alternative additional stainless steel guide piece is welded to the inside of each handle half at an approximate midpoint of the handle half rather than welding a single additional stainless steel guide piece to one handle half with an opening for receiving the blade piece tang. The alternative additional stainless steel guide pieces are configured for making contact on either side of the blade piece tang. Other embodiments do not include any additional stainless steel guide pieces welded to the inside of the handle. In further embodiments, the blade piece tang does not include an opening for a hang hole and is configured to extend into the handle portion to a position distal of the hang hole.

When fully assembled, the hand tool of the present invention provides a strong, durable, and sterilizable hand tool.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

Figure 1:
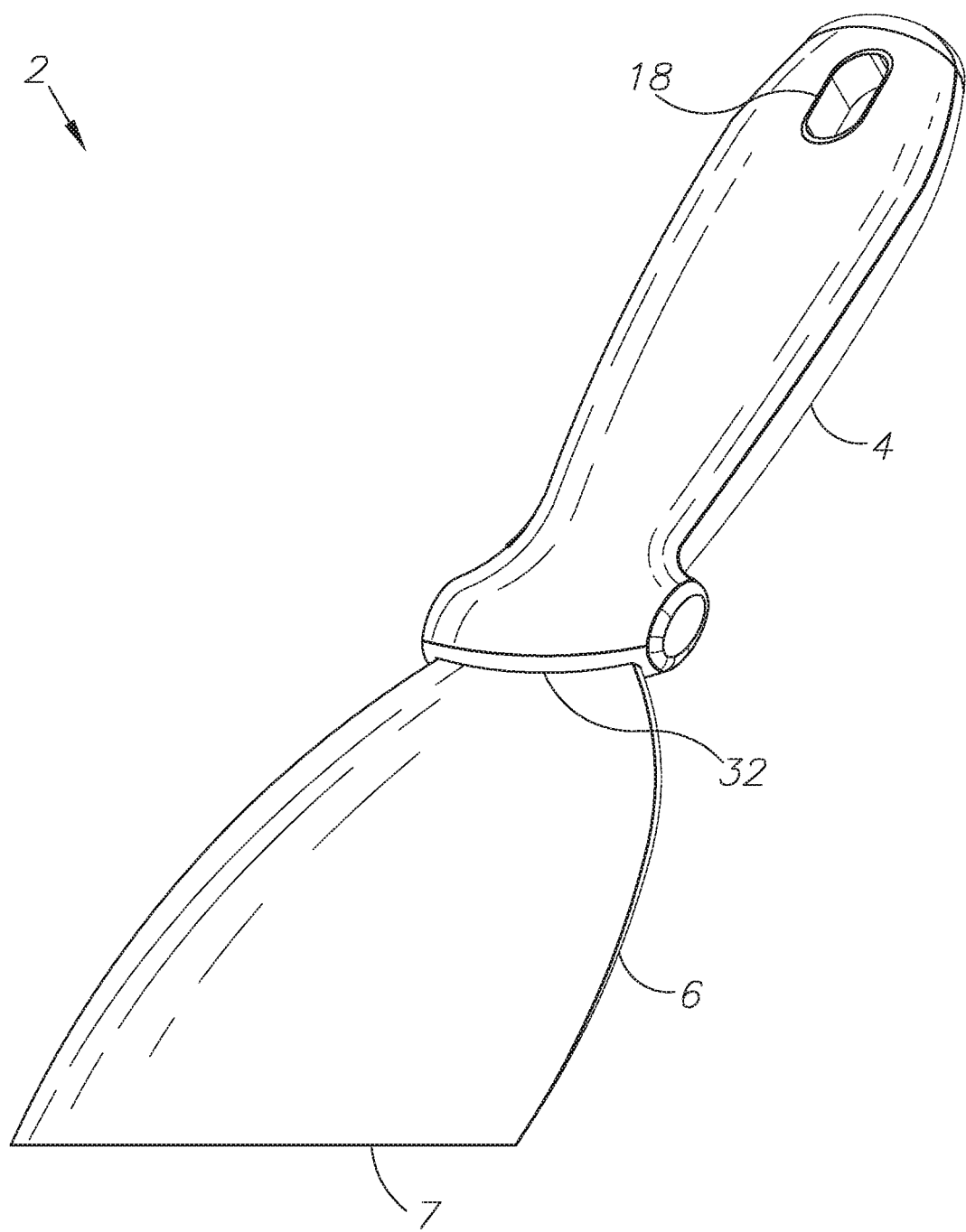
FIG. 1 is an upper, distal end, perspective view of a hand tool embodying the present invention.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Additionally, anatomical terms are given their usual meanings. For example, proximal means closer to the trunk of the body, and distal means further from the trunk of the body. The terms proximal and distal, when describing a hand tool, are intended to refer to the proximity to the trunk of a user's body when the hand tool is in use as intended. Said terminology will include the words specifically mentioned, derivatives thereof and words of similar meaning.

II. Preferred Embodiments

The present invention discloses a strong, durable, all metal hand tool 2 configured for use scraping, spreading, cutting, and/or flipping material and a method of construction. The hand tool 2 of the present invention includes a blade piece 6 connected to a handle 4 made up of two, symmetrical, handle half pieces 8. In a preferred embodiment, the hand tool 2 is composed completely of stainless steel. However, alternatively, hand tools embodying the present invention may be made up of other metals. Preferably, the hand tool metal is sterilizable to accommodate use of the hand tool in sterile environments.

FIGS. 1-11 show an exemplary embodiment of a hand tool 2 of the present invention. The hand tool 2, in this embodiment, has a blade piece 6 which includes a blade 7 configured for use in making contact with material to be scraped, spread, cut, or flipped. The blade piece 6 attaches to a handle 4, which is positioned opposite, or proximally, of the blade 7. The handle 4 is configured for being held by a user while the user applies force with the blade 7. Preferably, the blade 7 is flexible, in addition to being strong and durable, to accommodate efficient spreading, scraping, and/or flipping techniques. The shape, width, and thickness of the blade piece 6 can be varied in different embodiments of the present invention. In some embodiments, the distal end of the blade 7 may be sharpened for cutting uses, while in other embodiments, the blade 7 distal end may be dull to prevent injury to the user or damage to other objects while still being effective for spreading, scraping, and/or flipping uses.

Figure 8:
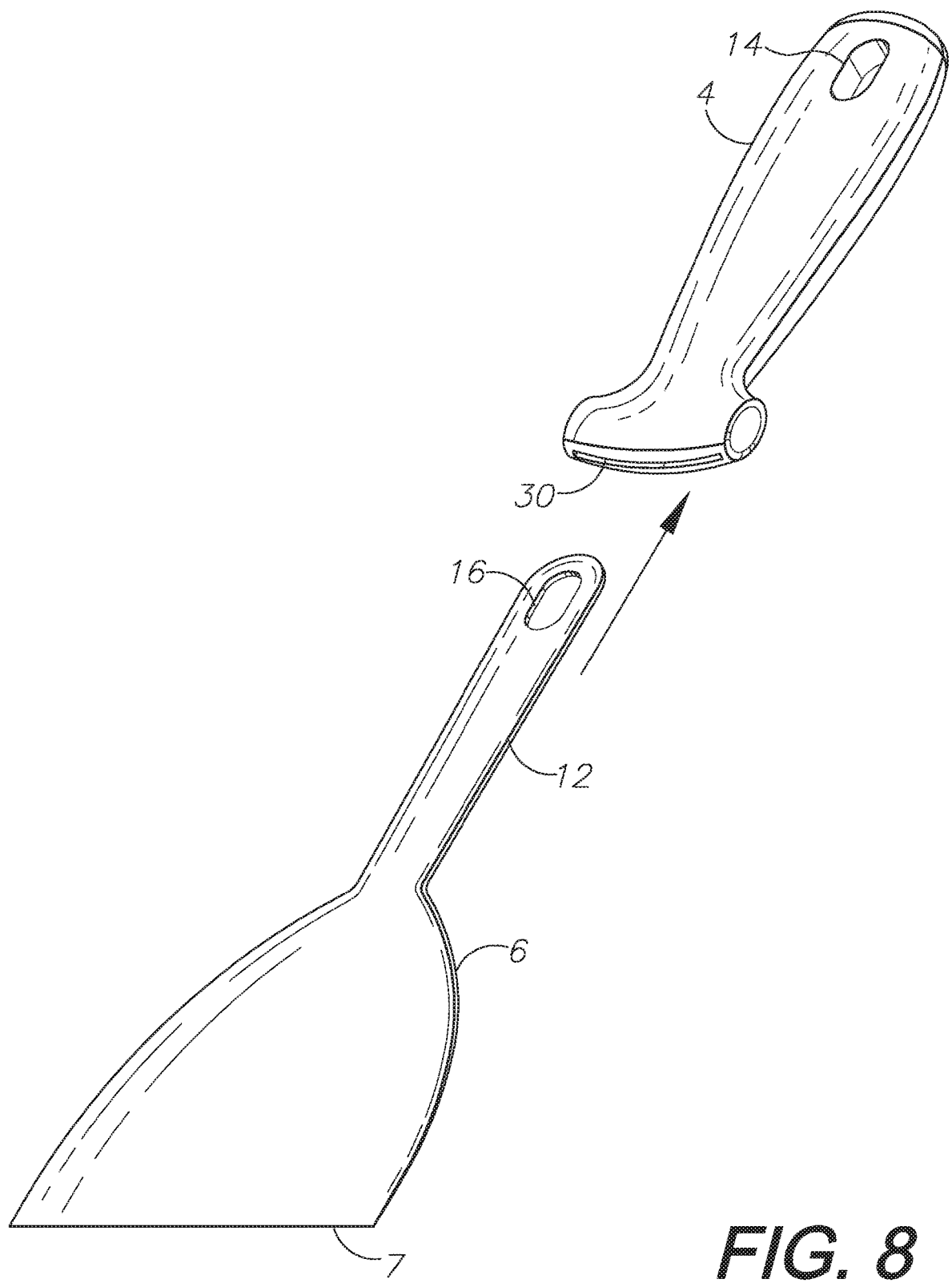
FIG. 8 is an upper, distal end, perspective, partially exploded view of the hand tool with an assembled handle and an exploded blade piece.
Figure 9:
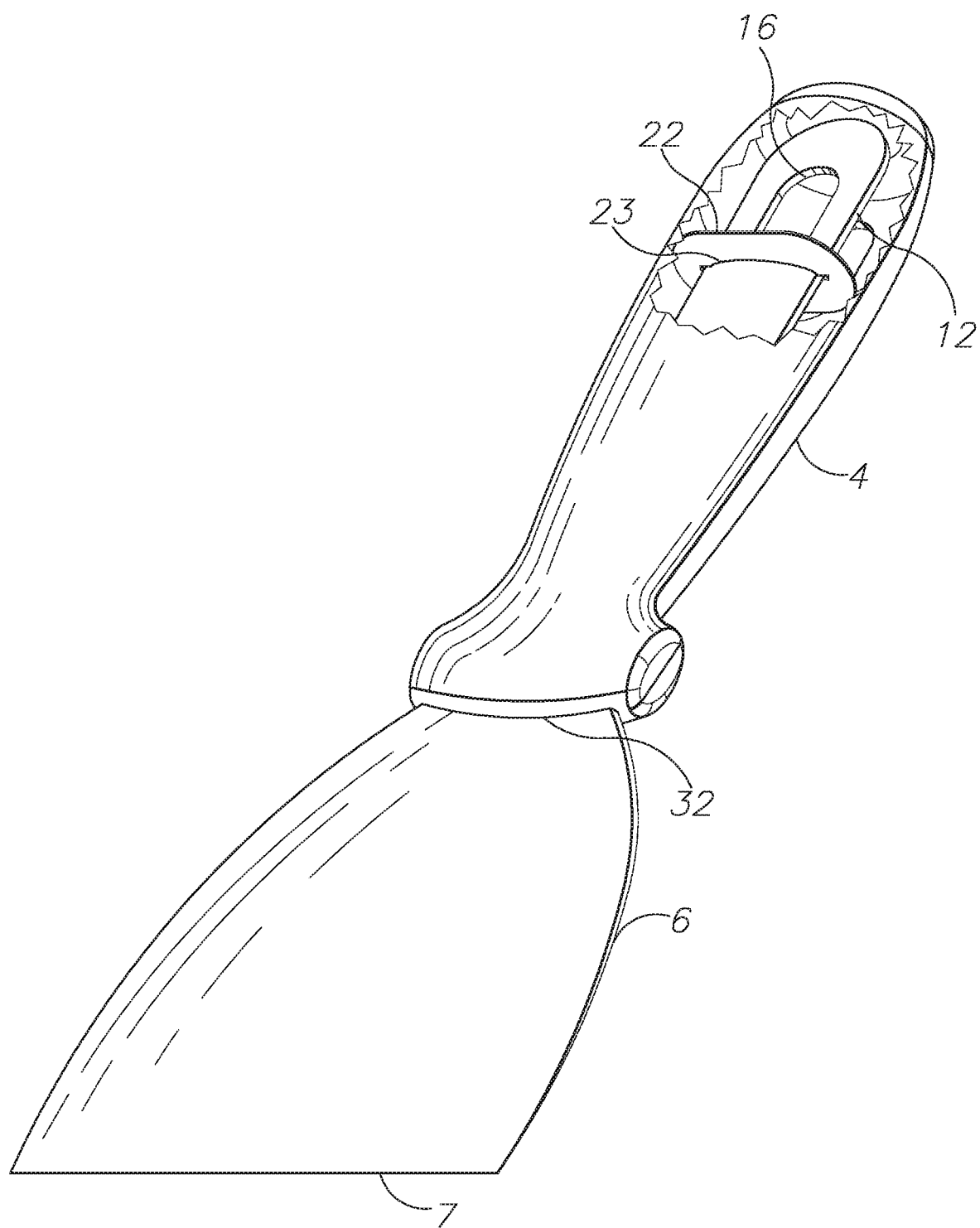
FIG. 9 is an upper, distal end, perspective view of the hand tool with the blade piece assembled into the handle, including a broken portion of the handle piece to illustrate the connection between the blade piece extended tang and the handle.
Figure 11:
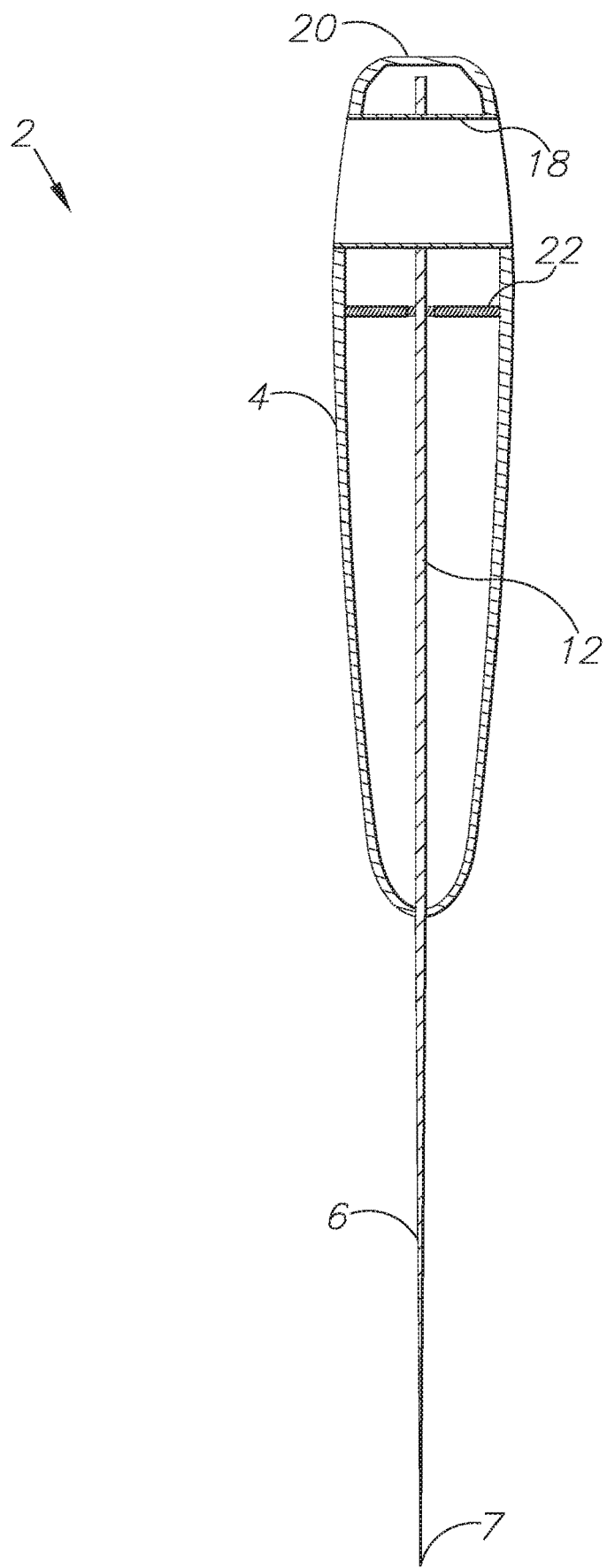
FIG. 11 is a side, elevational, cross-sectional view of the hand tool of the present invention.

The blade piece 6 is substantially flat and includes an elongated tang 12 opposite or proximal of the blade 7, the elongated tang 12 configured for placement within the handle 4 of the hand tool 2. In this embodiment, the blade piece elongated tang 12 is configured to extend the majority of the length of the handle 4 when the hand tool 2 is fully assembled, as shown in FIGS. 8-9 and 11. The blade piece tang 12 further includes an opening 16 near its proximal end for receiving a hang hole 18 therethrough.

The handle 4, in this embodiment, is composed of two symmetrical, stainless steel, contoured handle halves 8, each handle half 8 having an opening 14 near the handle 4 proximal end configured for receiving a hang hole piece 18. Preferably, when assembled, the contour of the handle 4 provides a comfortable, ergonomic fit for a user's hand. In an exemplary embodiment, as shown in FIGS. 6-7, 9, and 11, the handle halves 8 each have a hollow interior. However, in alternative embodiments, the handle 4 can be made of solid metal, with a recessed groove or channel for connection to the blade piece 6 and an opening 14 for receiving a hang hole piece 18.

Figure 5:
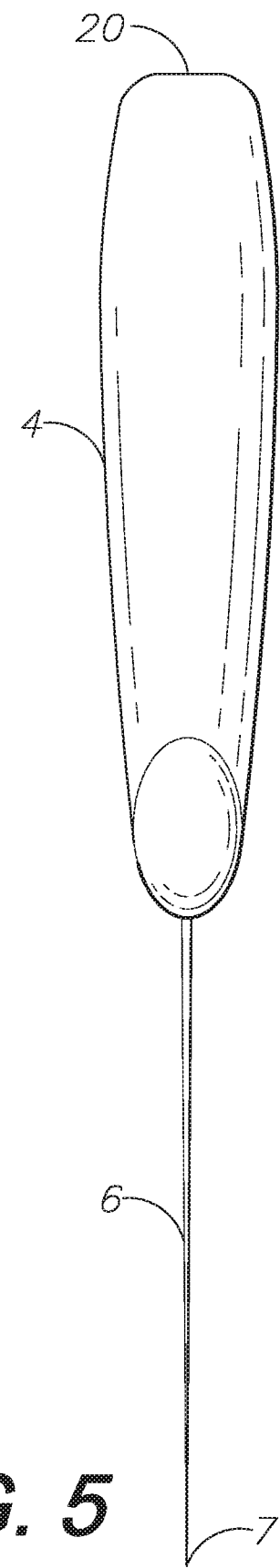
FIG. 5 is a right side, elevational view of the hand tool of the present invention, the left side, elevational view being a mirror image thereof.
Figure 6:
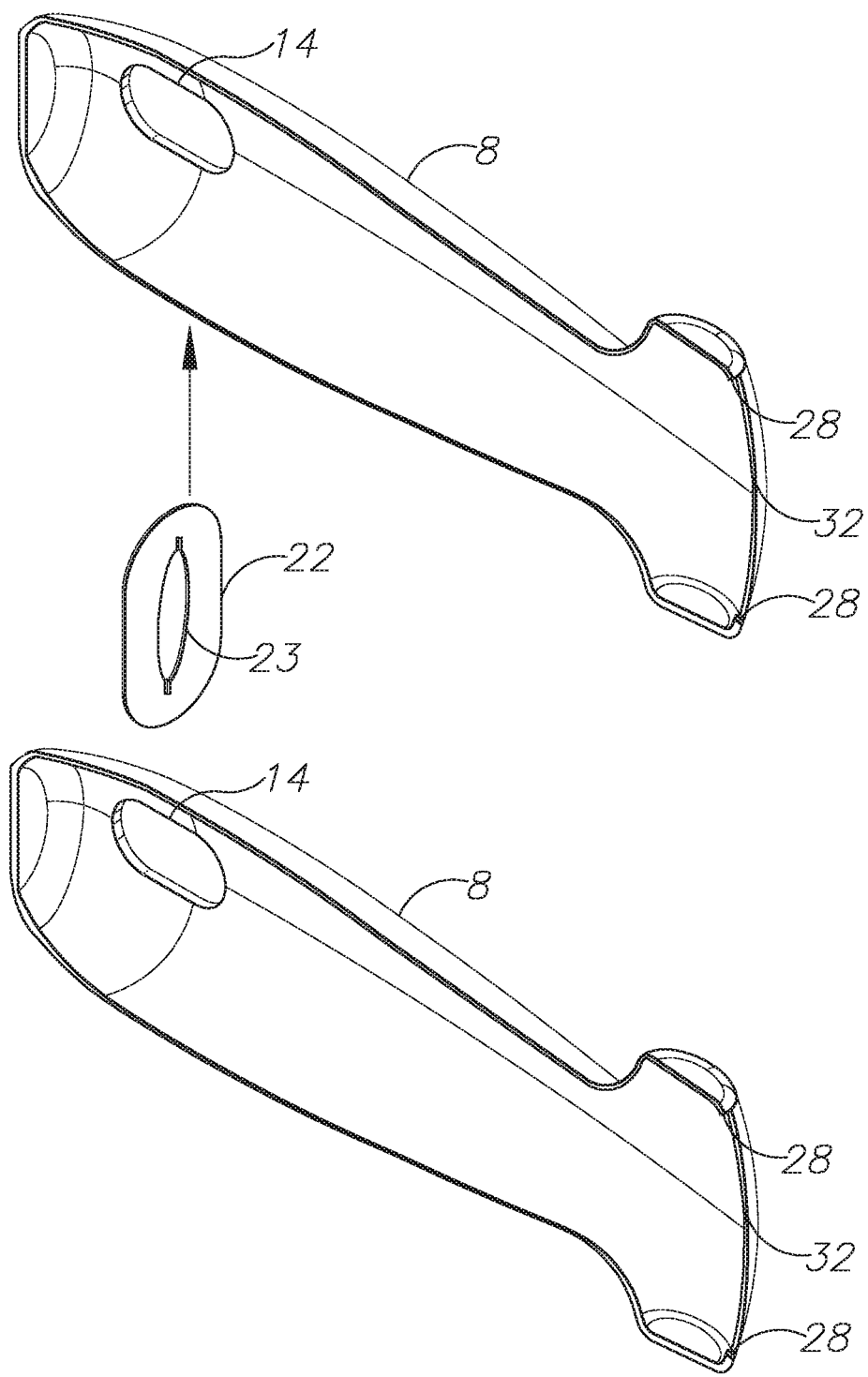
FIG. 6 is an upper, distal end, perspective, exploded view of the handle of the hand tool of the present invention.
Figure 7:
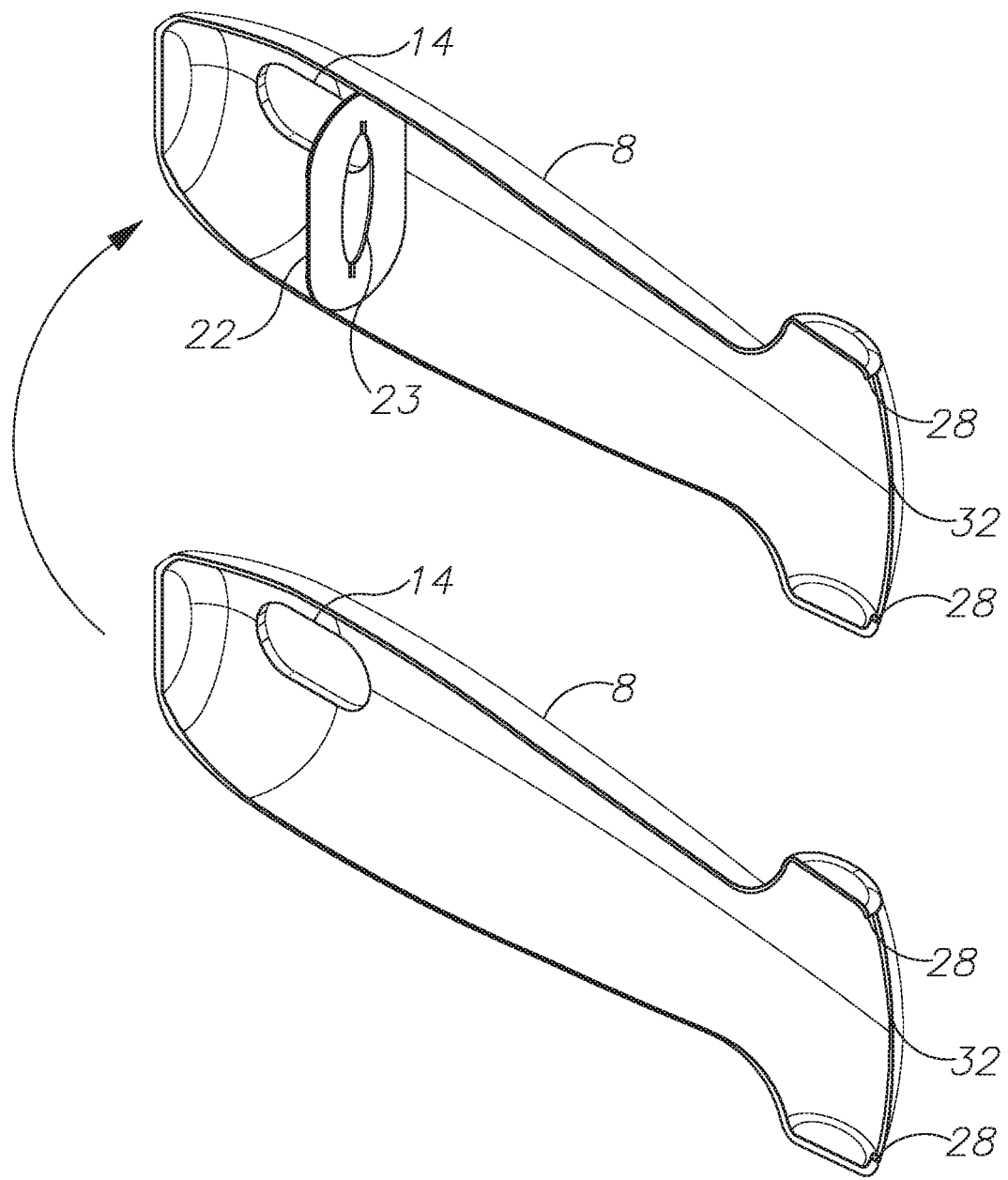
FIG. 7 is an upper, distal end, perspective, partially exploded view of the handle of the hand tool with a guide piece assembled into one handle half.

Each handle half piece 8 includes a slight notch 28 at its distal end such that when the handle halves 8 are aligned and welded together to form the assembled handle 4, an opening 30 is formed at the handle 4 distal end configured for receiving and closely fitting around the blade piece elongated tang 12, as shown in FIGS. 6-8. Additionally, in an exemplary embodiment, the handle 4 includes a curved distal end 32. Preferably, the curvature of the handle curved distal end 32 is concave toward the rest of the handle 4 and convex toward the blade 7 of the assembled hand tool 2, as shown in FIGS. 1-11. However, in alternative embodiments, the curvature of the handle distal end may curve in the opposite direction, or convex toward the rest of the handle and concave toward the blade. With the blade piece 6 assembled into the handle 4, the blade piece 6 and the handle 4 are welded to each other along the handle curved distal end 32 on either side of the blade piece 6. This curved weld provides added strength and durability to the hand tool 2 of the present invention. The curvature provides for additional surface area for the welded connection between the blade piece 6 and the handle 4. Moreover, the curved weld helps to better displace the force applied to the blade 7 when compared to a connection made in one linear plane.

In the embodiment shown in FIGS. 1-11, one handle half 8 further includes an additional stainless steel tang guide piece 22 welded to the inside of the handle half 8 at a longitudinal position closer to the proximal end of the handle 4 than the distal end but distal of the hang hole opening 14. In a preferred embodiment, shown in FIGS. 6-7, the additional steel tang guide piece 22 is a stadium-shaped, or obround, piece of stainless steel and extends substantially across the entire width of the handle half 8. However, alternative shapes of a tang guide piece can be utilized in hand tools embodying the present invention. In this embodiment, the additional steel tang guide piece 22 extends outward from the interior of the handle half 8 such that approximately half of the tang guide piece 22 fits within the handle half 8 to which it is welded, and the other approximate half of the tang guide piece 22 fits within the second handle half 8 when the handle halves 8 are assembled to form the handle 4.

The additional steel tang guide piece 22 includes an opening or receiver 23 configured for receiving the elongated tang 12 of the blade piece 6 when the blade piece 6 is inserted into the handle 4. In a preferred embodiment, the tang opening or receiver 23 in the additional stainless steel tang guide piece 22 is generally lens-shaped with extended ends configured for receiving and fitting tightly around the blade piece tang 12 to provide an additional point of strength between the blade piece 6 and the handle 4. The general lens-shape helps to more easily guide the elongated tang 12 into the tang opening or receiver 23 during assembly of the hand tool 2. However, a narrower tang guide piece opening or receiver for fitting more closely around the entire width of the blade piece tang 12 can also be used. Other embodiments may alternatively include a wider tang guide piece opening or receiver.

In an exemplary embodiment, to attach the additional stainless steel tang guide piece 22 to a handle half 8, a rivet or alternative small metal shaft is first spot welded to the handle half 8 intended to receive the additional steel tang guide piece 22. Then the tang guide piece 22 is welded to the rivet or alternative extended metal shaft using a shielded metal arc welding, or stick welding, technique. However, in other embodiments, the additional steel tang guide piece 22 may be precision welded to the interior of the handle half 8 or attached to the handle half 8 using alternative techniques.

Figure 10:
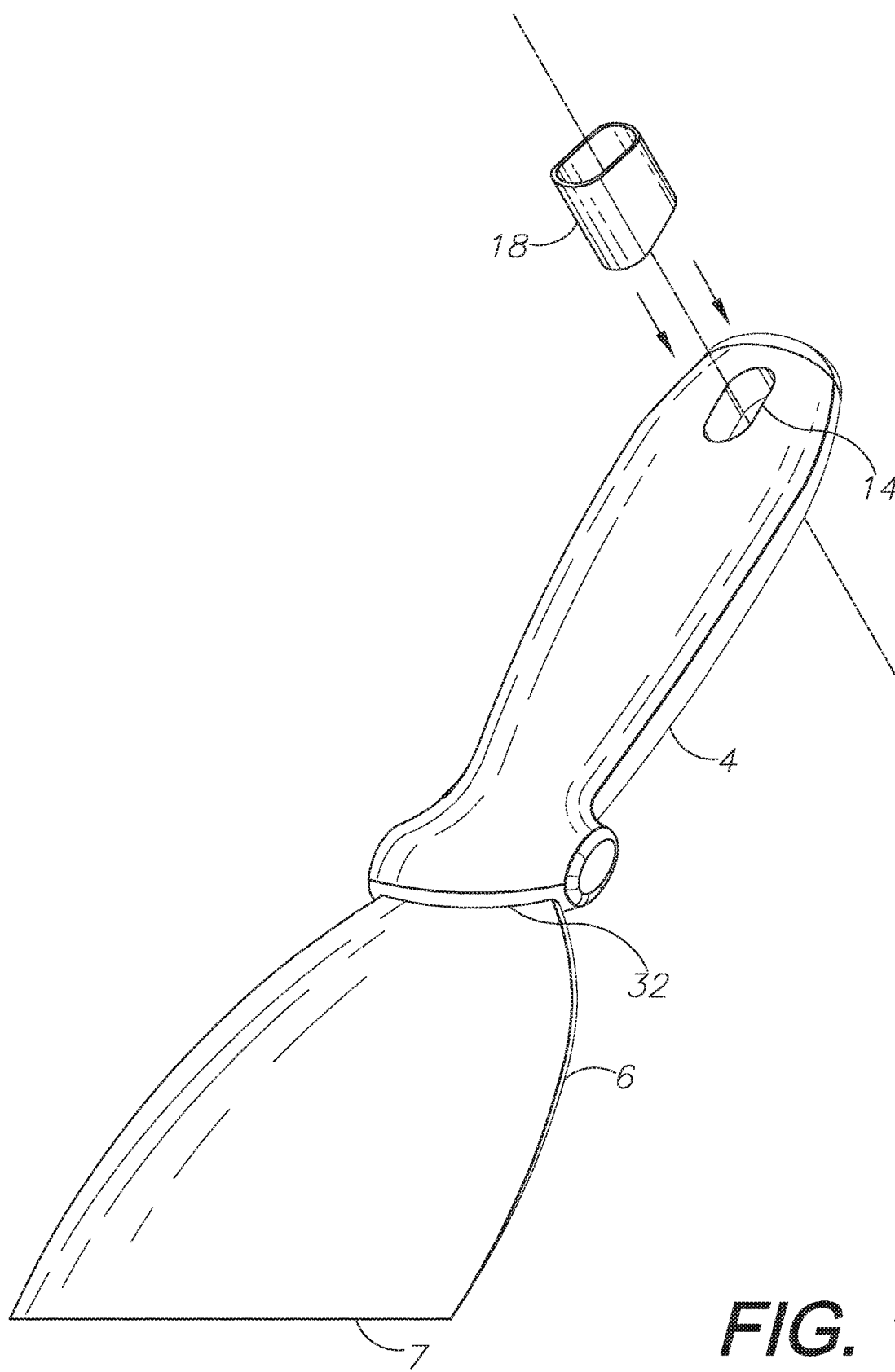
FIG. 10 is an upper, distal end, perspective, partially exploded view of the hand tool with an assembled handle and blade piece and an exploded hang hole piece.

In this embodiment, a stainless steel hang hole piece 18 closely fits through the hang hole opening 14 in each handle half 8 and the hang hole opening 16 in the blade piece tang 12 with the tool 2 fully assembled, as shown in FIGS. 10-11. The hang hole 18 is welded to the handle 4 around each handle half hang hole opening 14, and the hang hole piece 18 connecting though the blade piece elongated tang 12 provides another point of strength for the connection of the blade piece 6 and the handle 4. The hang hole 18 of the hand tool 2 allows a user to hang the hand tool 2 on a hook or other object as desired. In the embodiment shown in FIGS. 1-11, the sides of the hang hole 18 form an obround or stadium-shape. However, alternatively, the hang hole can be circular, oval-shaped, diamond-shaped, square, rectangular, triangular, or any other shape. Further embodiments may not include a hang hole.

Figure 2:
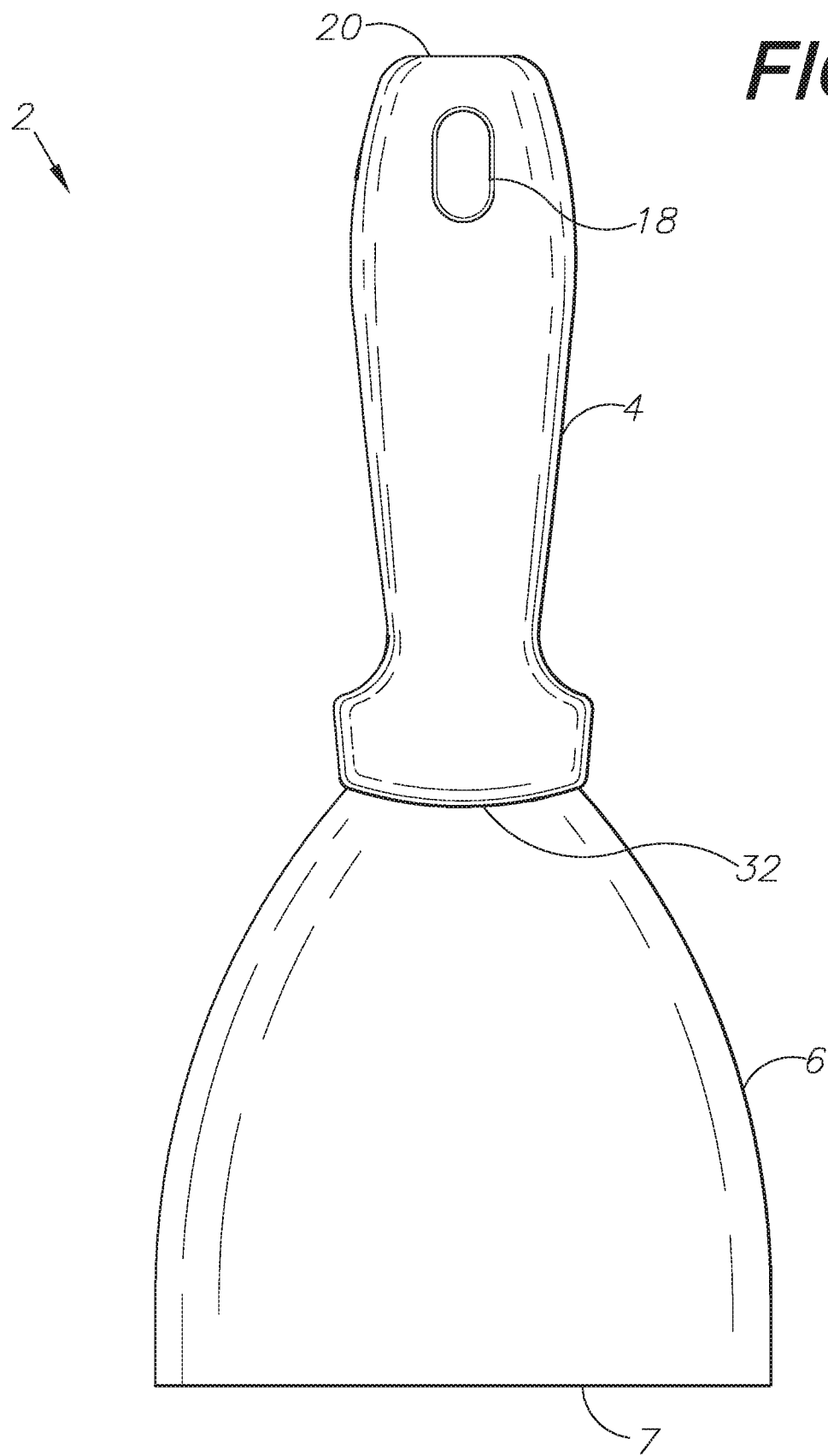
FIG. 2 is a top, elevational view of the hand tool of the present invention, the bottom, elevational view being a mirror image thereof.
Figure 3:
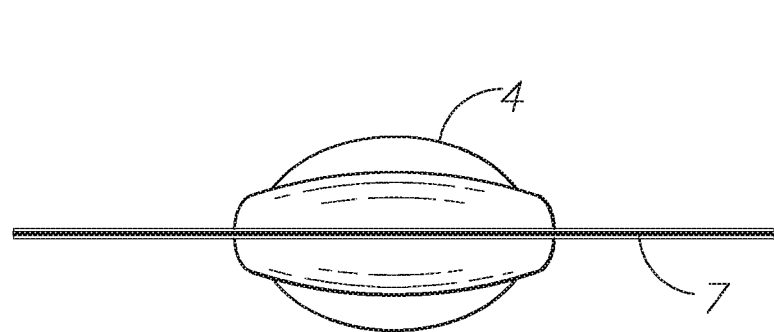
FIG. 3 is a distal end, elevational view of the hand tool of the present invention.
Figure 4:
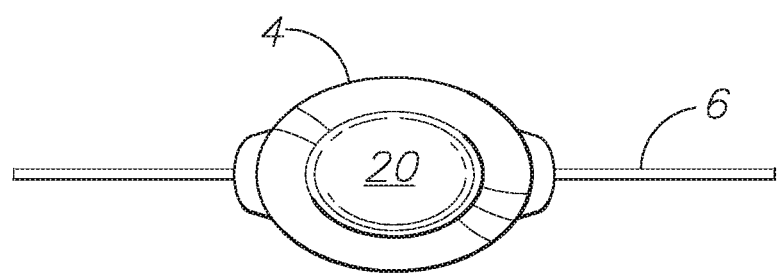
FIG. 4 is a proximal end, elevational view of the hand tool of the present invention.

The hand tool 2 of the present invention may optionally include a flattened hammer end 20 on the handle 4 proximal end, as shown in FIGS. 2, 5, and 11, to allow a user to hammer nails or other objects with the hand tool 2. The hammer end 20 may or may not be weighted to accommodate more effective hammering.

In an exemplary method of construction of the hand tool 2 of the present invention, as illustrated by FIGS. 6-10, an additional stainless steel tang guide piece 22 having a tang opening or receiver 23 is first welded to the inside of one of the two handle half pieces 8. In a preferred embodiment, this is conducted by first spot welding a rivet or alternative small, extended metal shaft to the handle half 8 which is to receive the additional metal tang guide piece 22. Then, the tang guide piece 22 is placed at a longitudinal position closer to the proximal end of the handle 4 than the distal end, but distal of the hang hole opening 14, and shielded metal arc welded, or stick welded, to the rivet or alternative extended metal shaft. However, alternative welding techniques can be utilized to attach the tang guide piece 22 to the handle half 8.

The second handle half piece 8 is then aligned with the first handle half piece 8, and the handle halves are spot welded together at a total of four points, one point on each side of the distal end of the handle 4 and one point on each side of the proximal end of the handle 4. Next, the handle halves 8 are precision welded to each other around the edges of the handle 4, leaving open the handle distal end tang opening 30. The blade piece elongated tang 12 is then inserted into the handle 4 through the open distal end 30 and through the opening 23 in the additional stainless steel tang guide piece 22 until the hang hole opening 16 of the blade piece tang 12 matches up with the hang hole openings 14 in the handle 4.

A stainless steel hang hole 18 is then inserted through the openings 14, 16 in the handle 4 and the blade piece 6. The hang hole 18 is precision welded to the handle 4 around each handle hang hole opening 14, and the handle 4 is precision welded to the blade piece 6 along the distal end of the handle 4 on either side of the blade piece 6. In a preferred embodiment, the handle 4 includes a curved distal end 32 to provide added surface area for the welded connection of the handle 4 to the blade piece 6 and better displacement of force applied to the blade 7, resulting in added strength and durability of the hand tool 2. However, alternative embodiments include a handle with a straight distal end.

Figure 12:
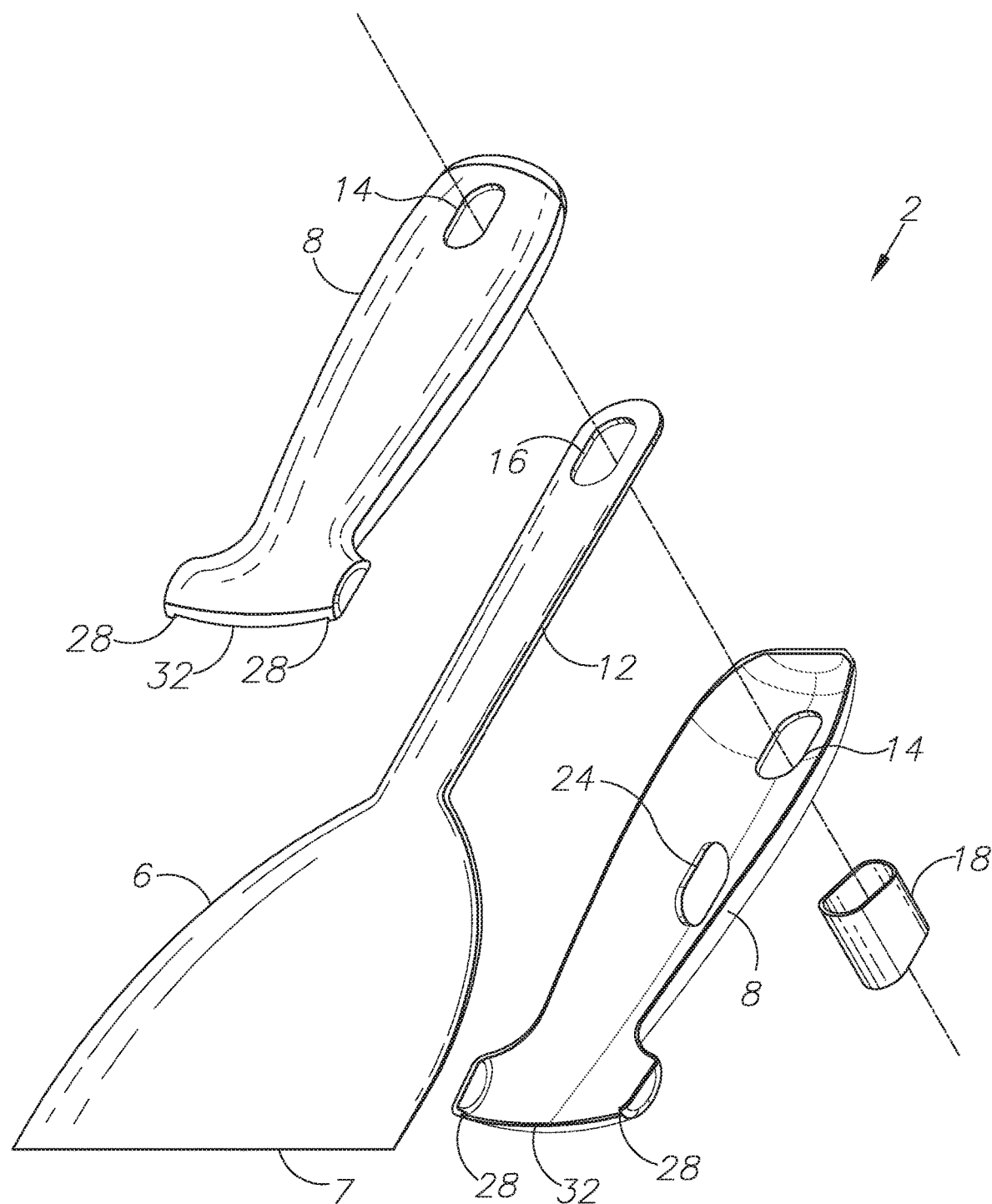
FIG. 12 is an upper, distal end, perspective, exploded view of a hand tool embodying the present invention including alternative guide pieces connected to the inside of the handle, one alternative guide piece in each handle half.
Figure 13:
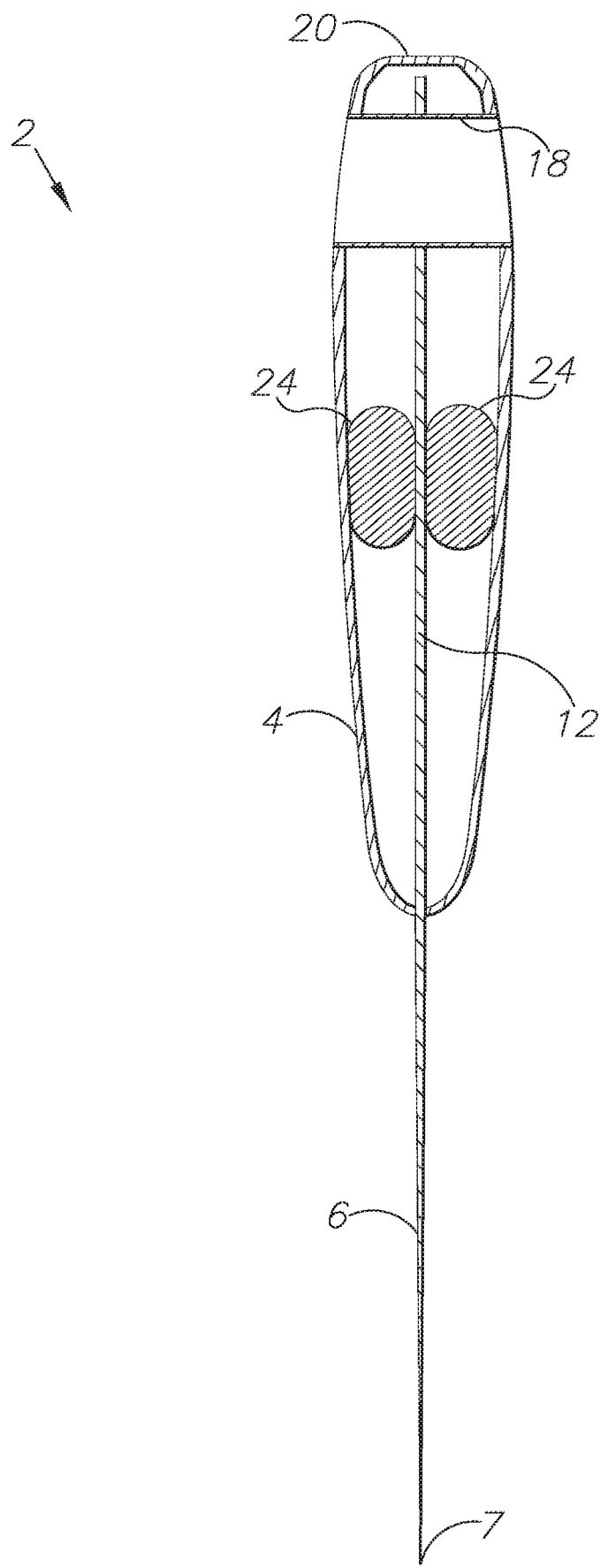
FIG. 13 is a side, elevational, cross-sectional view of the hand tool having alternative guide pieces.

FIGS. 12-13 show the hand tool 2 of the present invention having an alternative additional stainless steel tang guide mechanism instead of the tang guide piece 22 shown in FIGS. 6-7, 9, and 11. In this embodiment, each handle half 8 includes an alternative additional stainless steel tang guide piece 24 welded to the inside of the handle half 8 at an approximate midpoint of the handle 4. These alternative tang guide pieces 24 are configured to make contact with the blade piece elongated tang 12 on either side of the tang 12 when the hand tool 2 is assembled, providing an additional point of strength. In construction of the hand tool 2 shown in FIGS. 12-13, the alternative tang guide pieces 24 are welded to the interior of each handle half 8 prior to welding the handle halves 8 together and prior to insertion of the blade piece 6 and the hang hole 18. In further embodiments, each handle half 8 may include multiple additional stainless steel tang guide pieces 24 welded to the interior of the handle 4 to provide additional points of strength. Other embodiments do not include any additional stainless steel tang guide pieces.

Figure 14:
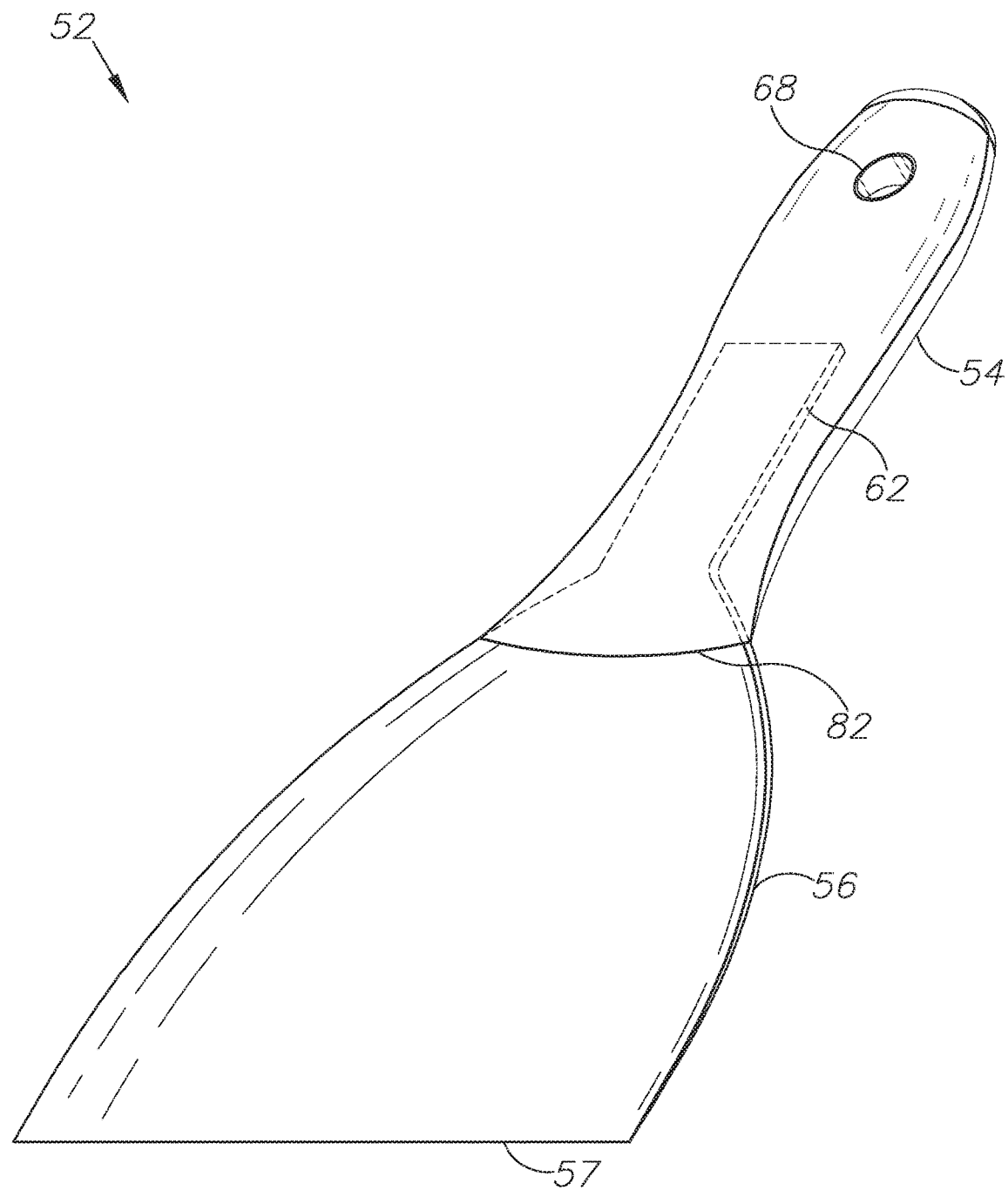
FIG. 14 is an upper, distal end, perspective view of an alternative embodiment of a hand tool of the present invention, showing the blade piece elongated tang in dashed lines.
Figure 15:
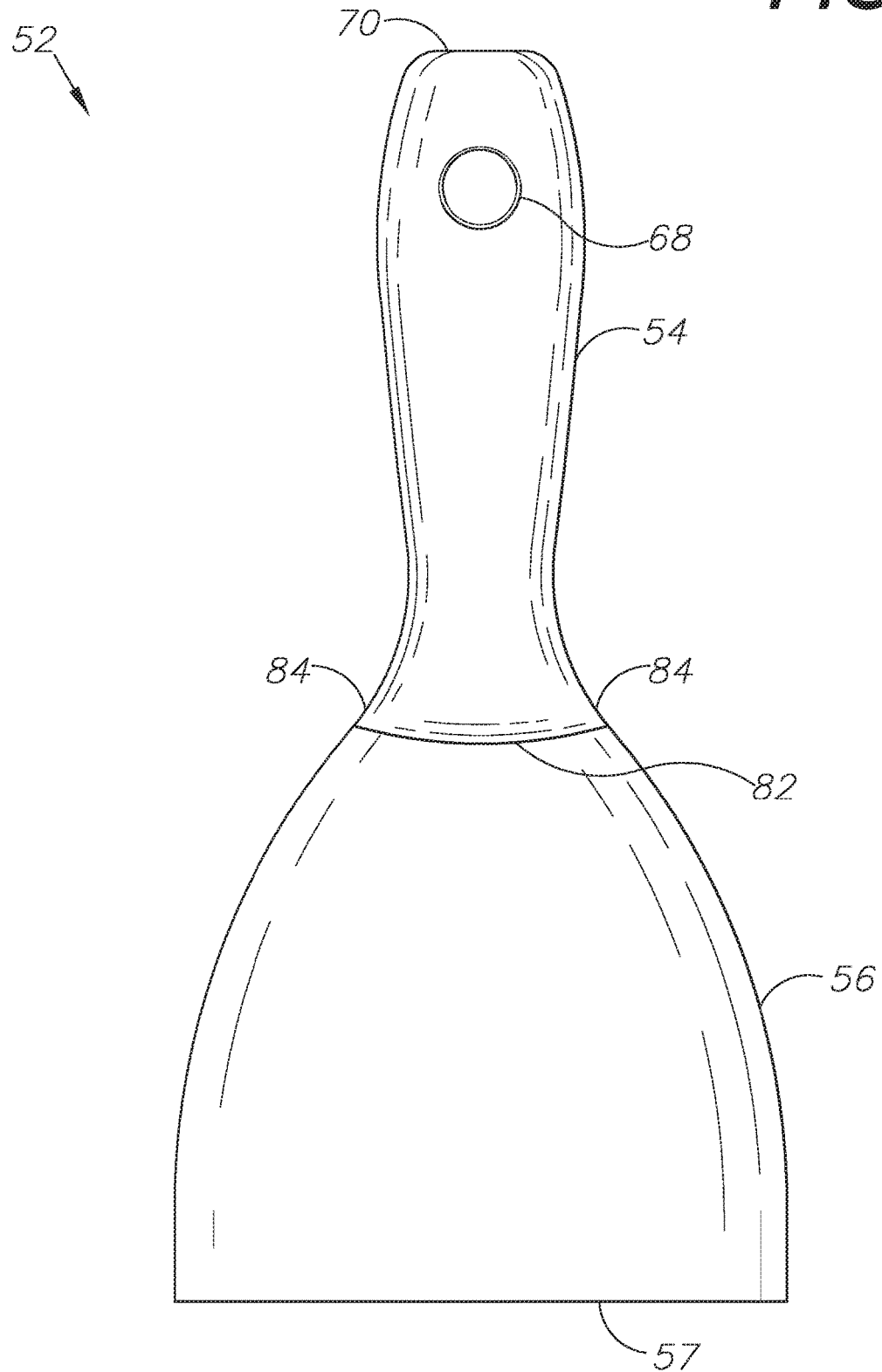
FIG. 15 is a top, elevational view of the alternative embodiment of a hand tool of the present invention, the bottom, elevational view being a mirror image thereof.
Figure 16:
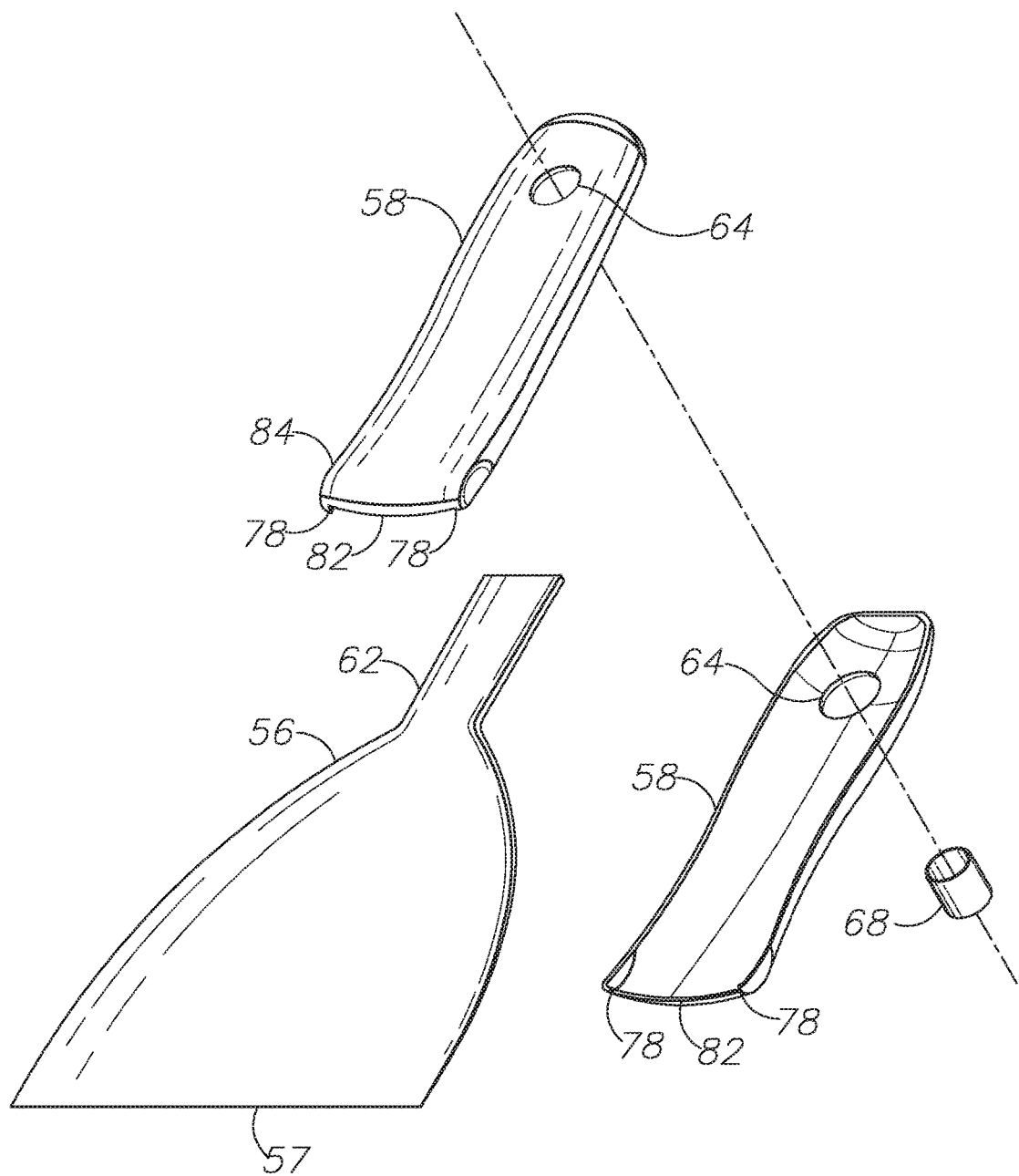
FIG. 16 is an upper, distal end, perspective, exploded view of the alternative embodiment of the hand tool of the present invention.

FIGS. 14-16 show an alternative hand tool 52 embodying the present invention. This alternative embodiment of a hand tool 52 of the present invention includes a handle 54 made up of two, symmetrical, contoured handle half pieces 58; a blade piece 56 having a blade 57 opposite an elongated tang 62; and a hang hole piece 68. The handle halves 58 each include an opening 64 for receiving and closely fitting around the hang hole piece 68 and a slight notch 78 at the handle half 58 distal end for forming an opening for receiving and closely fitting around the blade piece elongated tang 62 when the handle 54 is assembled. The handle 54, in this embodiment, further includes a curved distal end 82 and a hammer end 70.

In this embodiment, the blade piece elongated tang 62 extends proximally into the handle 54 but to a position distal of the handle hang hole openings 64. The embodiment shown in FIGS. 14-16 has the elongated tang 62 extending proximally into the handle 54 approximately half the length of the handle 54, however the tang 62 can be configured to extend into the handle 54 to any longitudinal position distal of the hang hole 68. Optionally, the handle 54 can include one or more additional stainless steel tang guide pieces.

The curved handle distal end 82 in this embodiment provides for a strong and durable welded connection between the blade piece 56 and the handle 54. Furthermore, the embodiment shown in FIGS. 14-16 includes a handle 54 with a flared distal end 84 and correspondingly widened blade piece. These handle distal end flares 84 provide additional surface area for the welded connection between the blade piece 56 and the handle 54. The combination of the handle distal end curvature 82 and flared ends 84 provides for a strong and durable welded connection between the blade piece 56 and the handle 54 and efficient displacement of force applied to the blade 57.

In construction of this embodiment, the handle halves 58 are aligned and welded together, first spot welded in four spots and then precision welded around the handle half 58 edges, leaving the distal end open. The blade piece 56 is inserted into the handle 54, and the blade piece 56 is precision welded to the handle 54 along the handle curved distal end 82 on either side of the blade piece 56. The hang hole 68 is inserted through the hang hole openings 64 in the handle halves 58 and then precision welded to the handle 54.

When fully assembled, the hand tool 2, 52 of the present invention is an all metal hand tool with a strong and durable connection between its handle and blade piece, in addition to exemplary blade flexion for scraping, spreading, cutting, and/or flipping techniques. Hand tools 2, 52 of the present invention accommodate use in the building and construction industry as putty knives, taping knives, and scrapers; in the food industry as scrapers, spatulas, and cutters; and in many other industries.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A stainless steel hand tool comprising:
   a blade piece having proximal and distal ends;
   said blade piece distal end comprising a blade and said blade piece proximal end comprising an elongated tang;
   a contoured handle having proximal and distal ends and a hollow interior;
   said handle comprising of a pair of welded together, symmetrical handle half pieces having proximal and distal ends;
   each handle half piece comprising a proximal end opening and a notched distal end;
   said handle half piece notched distal ends configured for forming said handle distal end receiver;
   said blade piece elongated tang received within said handle distal end receiver and extending proximally into said handle hollow interior;

said blade piece elongated tang further comprising a proximal end opening, said elongated tang proximal end opening aligned with said handle half piece proximal end openings;

an open hang hole piece extending through said handle half piece proximal end openings and said blade piece elongated tang proximal end opening in a direction approximately perpendicular to said blade, said open hang hole piece welded to said handle around outer edges of said hang hole piece;

an additional stainless steel tang guide piece welded to said handle hollow interior and configured for holding said blade piece elongated tang in place within said handle hollow interior, said additional stainless steel guide piece comprising a guide piece tang receiver for said blade piece elongated tang;

said blade piece connected to said handle via a welded connection between said blade piece and said handle at said handle distal end being a convexly curved welded connection between said blade piece tang and a corresponding convexly curved surface of said handle distal end, said curved welded connection configured for stiffening said blade relative to said handle;

said open hang hole piece welded to said handle around outer edges of said handle half piece proximal end openings; and said handle distal end being distally, convexly curved.

2. The metal hand tool according to claim 1, wherein:
said hand tool is made completely out of stainless steel.

3. The metal hand tool according to claim 1, wherein:
said handle proximal end comprises a flattened hammer end.

4. The metal hand tool according to claim 1, wherein:
said blade of the blade piece comprises a flexible portion for accommodating spreading, scraping, or flipping materials, said flexible portion configured to flex under an applied pressure.

5. The stainless steel hand tool according to claim 1, wherein:
said blade piece extended tang extends through said guide piece tang receiver in said handle hollow interior.

6. The stainless steel hand tool according to claim 1, wherein:
said additional stainless steel tang guide piece comprises multiple additional stainless steel pieces welded to said handle hollow interior and configured for holding said blade piece elongated tang in place within said handle hollow interior.

* * * * *